(12) United States Patent
Gayatri et al.

(10) Patent No.: US 11,164,007 B2
(45) Date of Patent: Nov. 2, 2021

(54) METHOD AND SYSTEM FOR DETECTING THE OWNER OF AN ABANDONED OBJECT FROM A SURVEILLANCE VIDEO

(71) Applicant: Conduent Business Services, LLC, Florham Park, NJ (US)

(72) Inventors: Vinuta Vishweshwar Gayatri, Bangalore (IN); Saikat Saha, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 174 days.

(21) Appl. No.: 16/520,276

(22) Filed: Jul. 23, 2019

(65) Prior Publication Data
US 2021/0027068 A1 Jan. 28, 2021

(51) Int. Cl.
*G06K 9/00* (2006.01)
*H04N 7/18* (2006.01)
*G06T 7/00* (2017.01)

(52) U.S. Cl.
CPC ...... *G06K 9/00771* (2013.01); *G06K 9/00711* (2013.01); *G06T 7/0002* (2013.01); *H04N 7/185* (2013.01); *G06K 2009/00738* (2013.01)

(58) Field of Classification Search
CPC .......... G06K 9/00771; G06K 9/00711; G06K 2009/00738; G06K 9/00744; H04N 7/185; G06T 7/0002
USPC ...................................................... 382/181
See application file for complete search history.

(56) References Cited

U.S. PATENT DOCUMENTS

| | | | |
|---|---|---|---|
| 7,535,358 B2 | 5/2009 | Crider et al. | |
| 7,813,528 B2 | 10/2010 | Porikli et al. | |
| 8,644,794 B1 | 2/2014 | Sites | |
| 8,872,655 B2 | 10/2014 | Buller et al. | |
| 9,424,659 B2 | 8/2016 | Feris et al. | |
| 9,454,728 B1 | 9/2016 | Bender et al. | |
| 10,212,494 B1 | 2/2019 | Struhsaker et al. | |
| 10,235,599 B2 | 3/2019 | Li et al. | |
| 10,248,868 B2 | 4/2019 | Oami | |
| 2006/0145913 A1 | 7/2006 | Kaltschmidt et al. | |
| 2007/0222587 A1 | 9/2007 | Crider et al. | |
| 2008/0247599 A1* | 10/2008 | Porikli | G06K 9/00771 382/103 |
| 2009/0173112 A1 | 7/2009 | Tropp | |
| 2009/0238462 A1* | 9/2009 | Feris | G06K 9/44 382/190 |

(Continued)

OTHER PUBLICATIONS

Tian et al. "Robust detection of abandoned and removed objects in complex surveillance videos", IEEE Trans. Syst. Man, Cybern. C, Appl. Rev., vol. 41, No. 5, pp. 565-576 (Sep. 2011).

(Continued)

*Primary Examiner* — Van D Huynh
(74) *Attorney, Agent, or Firm* — Ortiz & Lopez, PLLC; Kermit D. Lopez; Luis M. Ortiz

(57) ABSTRACT

A video surveillance method and system involves transitioning pixel intensities in a region associated with a fixed location from background values to values representing an image of an object when the object is abandoned at a fixed location in a scene in a video, and identifying an instance of time in the video when the object is abandoned, based on the transitioned pixel intensities resulting from the transitioning of the pixel intensities.

20 Claims, 8 Drawing Sheets

(56) References Cited

U.S. PATENT DOCUMENTS

| | | | | |
|---|---|---|---|---|
| 2010/0128930 | A1* | 5/2010 | Liu | G06K 9/00771 382/103 |
| 2010/0191367 | A1 | 7/2010 | Grundmann et al. | |
| 2012/0183177 | A1* | 7/2012 | Ku | G06T 7/155 382/103 |
| 2012/0263350 | A1 | 10/2012 | Delianski | |
| 2013/0108102 | A1* | 5/2013 | Brown | G06K 9/00369 382/103 |
| 2013/0228264 | A1 | 9/2013 | Fitzsimmons | |
| 2013/0265434 | A1* | 10/2013 | Iwamoto | G06K 9/00342 348/157 |
| 2014/0233793 | A1* | 8/2014 | Zong | G06K 9/6277 382/103 |
| 2014/0247362 | A1* | 9/2014 | Li | G06T 7/254 348/159 |
| 2015/0010210 | A1* | 1/2015 | Feris | G06K 9/44 382/103 |
| 2016/0252646 | A1 | 9/2016 | Sarraiocco | |
| 2016/0314686 | A1 | 10/2016 | Shi et al. | |
| 2020/0193166 | A1* | 6/2020 | Russo | G06T 7/194 |

OTHER PUBLICATIONS

Elhabian et al., "Moving object detection in spatial domain using background removal techniques—state of art". Recent Patents on Computer Science 1, 32-54 (2008).

Cristani et al. "Background subtraction for automated multisensor surveillance: a comprehensive review", EURASIP Journal on Advances in signal Processing 2010, 43 (2010).

Bouwmans et al. "Traditional and recent approaches in background modeling for foreground detection: An overview", Computer Science Review 11, 31-66 (2014).

Sobral et al. "A comprehensive review of background subtraction algorithms evaluated with synthetic and real videos", Computer Vision and Image Understanding 122, 4-21 (2014).

Felzenszwalb et al. "Object detection with discriminatively trained Part based models", IEEE Transactions on Pattern Analysis and Machine Intelligence, vol. 32 Issue 9, pp. 1627-1645 (Sep. 2010).

Liu et al., "A 1D time-varying median filter for seismic random, spike-like noise elimination", Geophysics, vol. 74, Issue 1, pp. 1JF-Z17 (Jan. 2009).

Lin et al. "Abandoned Object Detection via Temporal Consistency Modeling and Back-Tracing Verification for Visual Surveillance", IEEE Transaction on Information Forensics and Security, vol. 10, No. 7 (Jul. 2015).

Bagheri et al. "Temporal mapping of surveillance video for indexing and summarization", Computer Vision and Image Understanding, vol. 144, pp. 237-257 (Mar. 2016).

Chang et al "Localized Detection of Abandoned Luggage", EURASIP Journal on Advances in Signal Processing vol. 2010, Article ID 675784, 9 pages (Dec. 2010).

Sidyakin et al. "Real-time detection of abandoned bags using CNN", The Federal State Unitary Enterprise "State Research Institute of Aviation System", Viktorenko street, 7, Moscow, Russia (Oct. 15, 2017).

Smith et al. "Detecting Abandoned Luggage Items in a Public Space", IDIAP Research Institute & 'Ecole Polytechnique F'ed'erale de Lausanne (EPFL), Switzerland (2006).

Smeureanu et al. "Real-Time Deep Learning Method for Abandoned Luggage Detection in Video", arXiv:1803.01160v3 [cs.CV] (Jun. 15, 2018).

Bhargava et al. "Detection of Abandoned Objects in Crowded Environments", Computer and Vision Research Center, Department of Electrical and Computer Engineering, The University of Texas at Austin (2007).

Redmon et al. "You Only Look Once: Unified, Real-Time Object Detection", arXiv:1506.02640v5 [cs.CV] (May 9, 2016).

Proceedings from Ninth IEEE International Workshop on Performance Evaluation of Tracking and Surveillance (PETS 2006) (Jun. 18, 2006).

* cited by examiner

METHOD AND SYSTEM FOR DETECTING THE OWNER OF AN ABANDONED OBJECT FROM A SURVEILLANCE VIDEO

TECHNICAL FIELD

Embodiments are related to the field of image processing. Embodiments further relate to techniques for identifying objects in video images including the detection and tracking of objects and identifying that owner of an object that has been abandoned or lost.

BACKGROUND

With the rising concerns of terrorism and global terrorism, the ability to implement efficient threat detection systems and techniques is of vital importance. Such systems and techniques should be able to detect and recognize potentially dangerous situations, and alert authorities to take appropriate action. Of particular significance is the situation in which objects such as luggage, boxes, bags and other items are left unattended in mass transit areas or other high density areas such as in public squares, arenas, and so on.

Video security systems for monitoring such objects include security cameras and are often used for surveillance and video data analysis. These security systems can be used to monitor buildings, lobbies, entries/exits, and secure areas within the buildings, to list a few examples. Additionally, such security systems can also be used to monitor public areas such as garages, parking lots, building exteriors, and other areas in or around the buildings. Generally, these security systems can be implemented to monitor usage but also to identify illegal activity such as theft or trespassing, to list a few examples.

Modern video security systems have the capability to analyze the video data captured by the security cameras. Typically, these systems can be used to track individuals and possibly notify security personnel if unauthorized persons are entering (or exiting) a restricted area, for example. Additionally, such security systems can also monitor objects within scenes. For example, abandoned objects (e.g., unattended backpacks or packages) should be identified in airport terminals, stadiums, or convention centers. On the other hand, security personnel should be notified if objects are removed from a museum or if merchandise is removed from a retail establishment.

A problem that has not been solved to date in such security systems is the lack of an ability to identify or detect the owner of an abandoned object. Tackling the problem of abandoned objects such as luggage involves three ordered sub-problems, including detecting the abandoned luggage, detecting the owner of the luggage, and tracking the owner of the luggage.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide an improved image processing method and system.

It is another aspect of the disclosed embodiments to provide for a method and system for detecting the owner of an abandoned object from a surveillance video.

The aforementioned aspects and other objectives and advantages can now be achieved as described herein. In an embodiment, a video surveillance method, can involve: when an object is abandoned at a fixed location in a scene in a video, transitioning pixel intensities in a region associated with the fixed location from background values to values representing an image of the object; identifying an instance of time in the video when the object is abandoned, based on the transitioned pixel intensities resulting from the transitioning of the pixel intensities in the region associated with the fixed location from the background values to the values representing the image of the object; and generating a first output comprising a video slip of a time before and after the transitioning, wherein the video slip displays an event of abandonment associated with the object, and a second output comprising an image constructed from a cross section in the constructed image intersecting the object and the transitioned pixel intensities in time, wherein at an instant of time in which there is a change in the pixel intensities, a representation in the image of a person associated with the object is confined to a localized region in a vicinity of the object in the image, wherein a search of this localized region results in an indication that the person shown in the localized region is an owner of the object that was abandoned.

In an embodiment of the method, the cross section can include a horizontal cross section.

In an embodiment of the method, the cross section can include a vertical cross section.

In an embodiment of the method, the cross section can include at least one of a horizontal cross section and a vertical cross section.

In an embodiment of the method, the aforementioned region can comprise a localized spatio-temporal region.

In an embodiment of the method, the object may comprise luggage.

In an embodiment of the method, a performance of a data-processing system can be improved by the transitioning of pixel intensities in a region associated with a fixed location from background values to values representing an image of the object; the identifying of an instance of time in the video when the object is abandoned, based on the transitioned pixel intensities resulting from the transitioning of the pixel intensities in the region associated with the fixed location from the background values to the values representing the image of the object; and the generating of the first output and the second output.

In an embodiment, a video surveillance system can include at least one processor and a memory, the memory storing instructions to cause the at least one processor to perform: when an object is abandoned at a fixed location in a scene in a video, transitioning pixel intensities in a region associated with a fixed location from background values to values representing an image of the object; identifying an instance of time in the video when the object is abandoned, based on the transitioned pixel intensities resulting from the transitioning of the pixel intensities in the region associated with the fixed location from the background values to the values representing the image of the object; and generating a first output comprising a video slip of a time before and after the transitioning, wherein the video slip displays an event of abandonment associated with the object, and a second output comprising an image constructed from a cross section in the constructed image intersecting the object and the transitioned pixel intensities in time, wherein at an instant of time in which there is a change in the pixel intensities, a representation in the image of a person associated with the object is confined to a localized region in a vicinity of the object in the image, wherein a search of this localized region results in an indication that the person shown in the localized region is an owner of the object that was abandoned.

In an embodiment of the system, the cross section can include a horizontal cross section.

In an embodiment of the system, the cross section can include a vertical cross section.

In an embodiment of the system, the cross section can include at least one of a horizontal cross section and a vertical cross section.

In an embodiment of the system, the region can comprise a localized spatio-temporal region.

In an embodiment of the system, the object can comprise luggage.

In an embodiment of the system, a data-processing system can comprise at least one of: the at least one processor and the memory, wherein a performance of a data-processing system is improved by: the instructions for transitioning pixel intensities in a region associated with a fixed location from background values to values representing an image of the object; the instructions for identifying of an instance of time in the video when the object is abandoned, based on the transitioned pixel intensities resulting from the transitioning of the pixel intensities in the region associated with the fixed location from the background values to the values representing the image of the object; and the instructions for generating the first output and the second output.

In another embodiment, a video surveillance system, can include: at least one surveillance camera that captures video of a scene, wherein when an object is abandoned at a fixed location in the scene in the video captured by the at least one surveillance camera, pixel intensities are transitioned by a processor in a region associated with a fixed location from background values to values representing an image of the object; wherein the processor identifies an instance of time in the video when the object is abandoned, based on the transitioned pixel intensities resulting from the transitioning of the pixel intensities in the region associated with the fixed location from the background values to the values representing the image of the object; and wherein the processor generates a first output comprising a video slip of a time before and after the transitioning, wherein the video slip displays an event of abandonment associated with the object, and a second output comprising an image constructed from a cross section in the constructed image intersecting the object and the transitioned pixel intensities in time, wherein at an instant of time in which there is a change in the pixel intensities, a representation in the image of a person associated with the object is confined to a localized region in a vicinity of the object in the image, wherein a search of this localized region results in an indication that the person shown in the localized region is an owner of the object that was abandoned.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
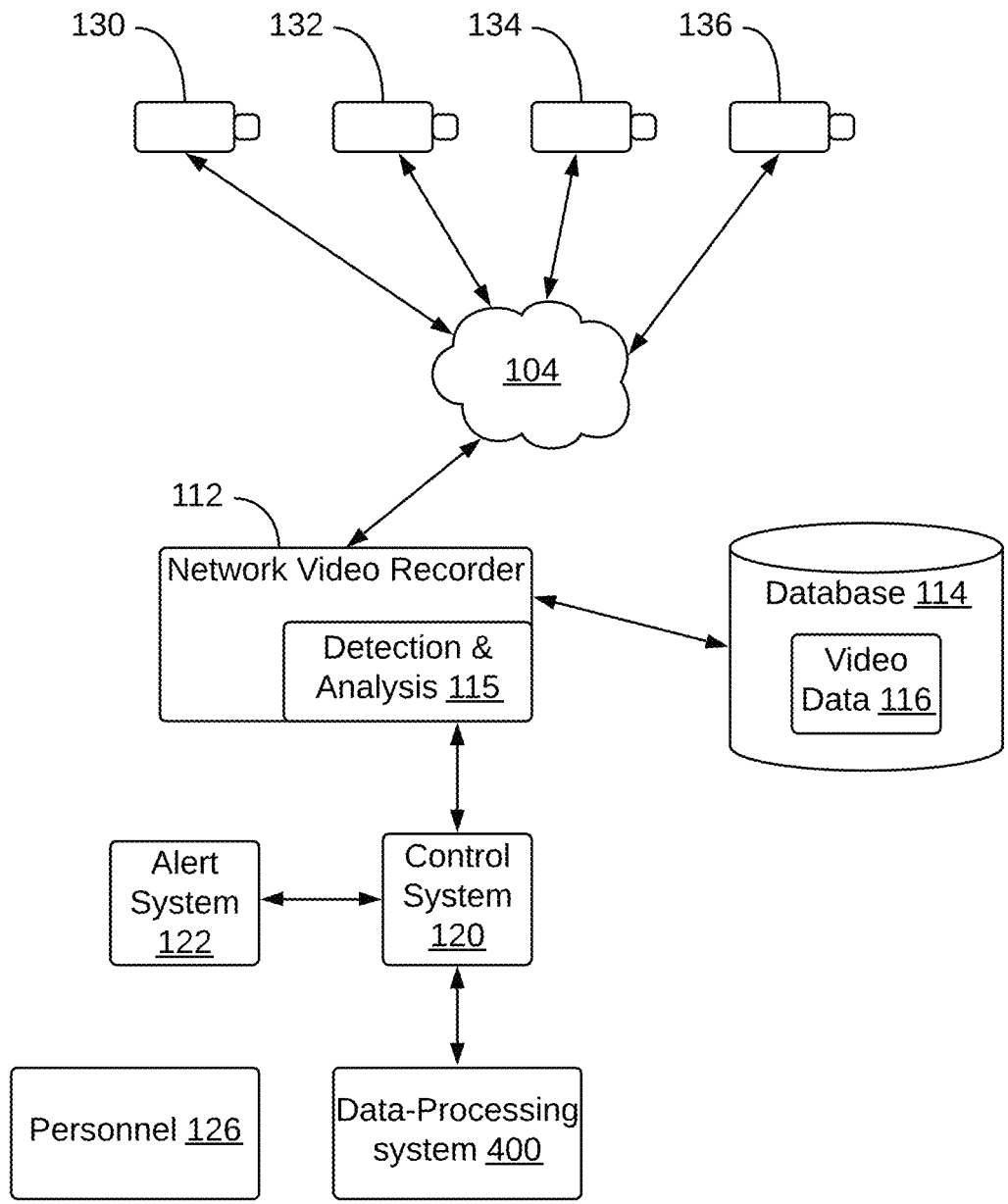
FIG. 1 illustrates a block diagram depicting a security system, which can be implemented in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Figure 2:
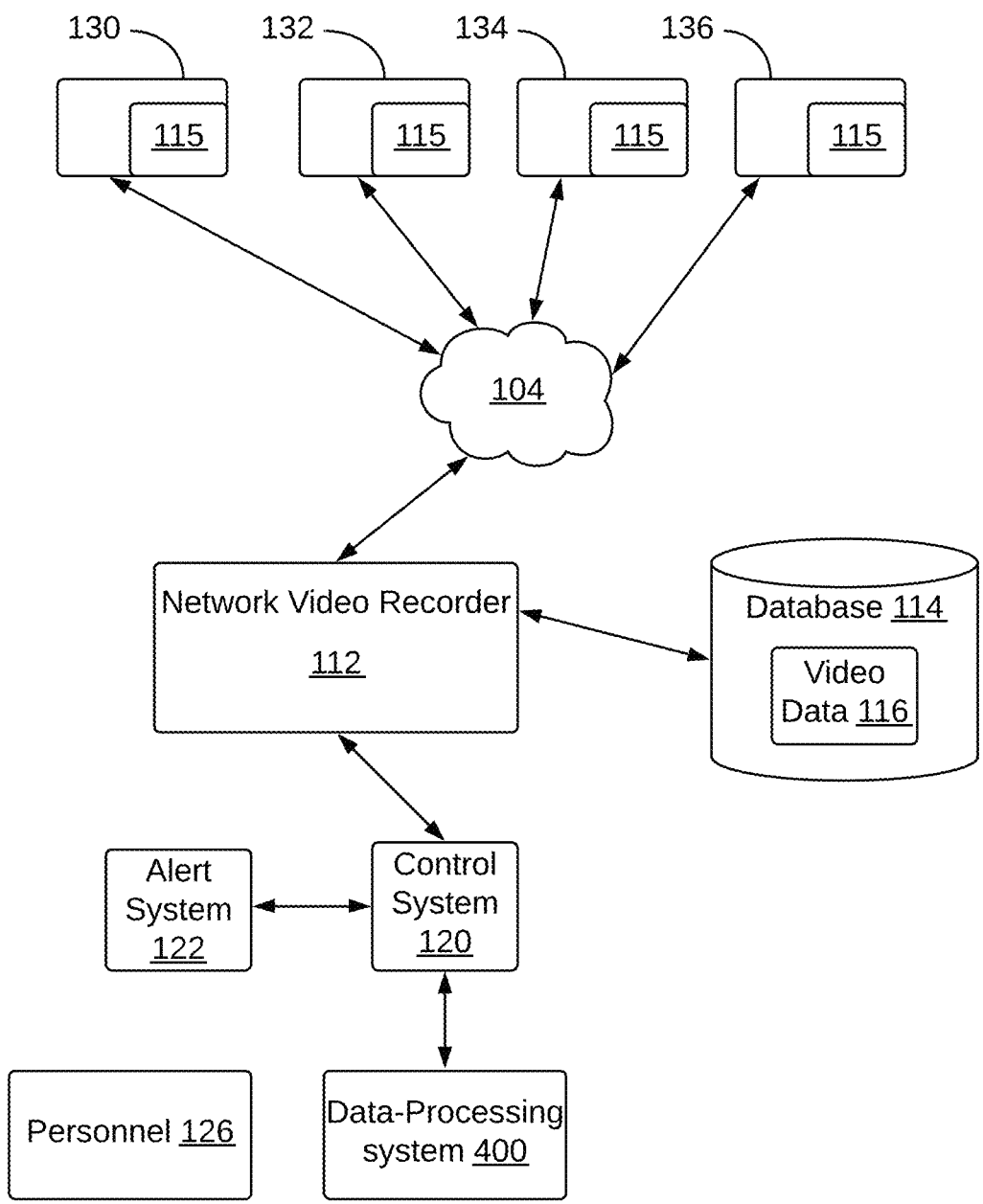
FIG. 2 illustrates a block diagram of a security system, which can be implemented in accordance with an alternative embodiment.
Figure 3:
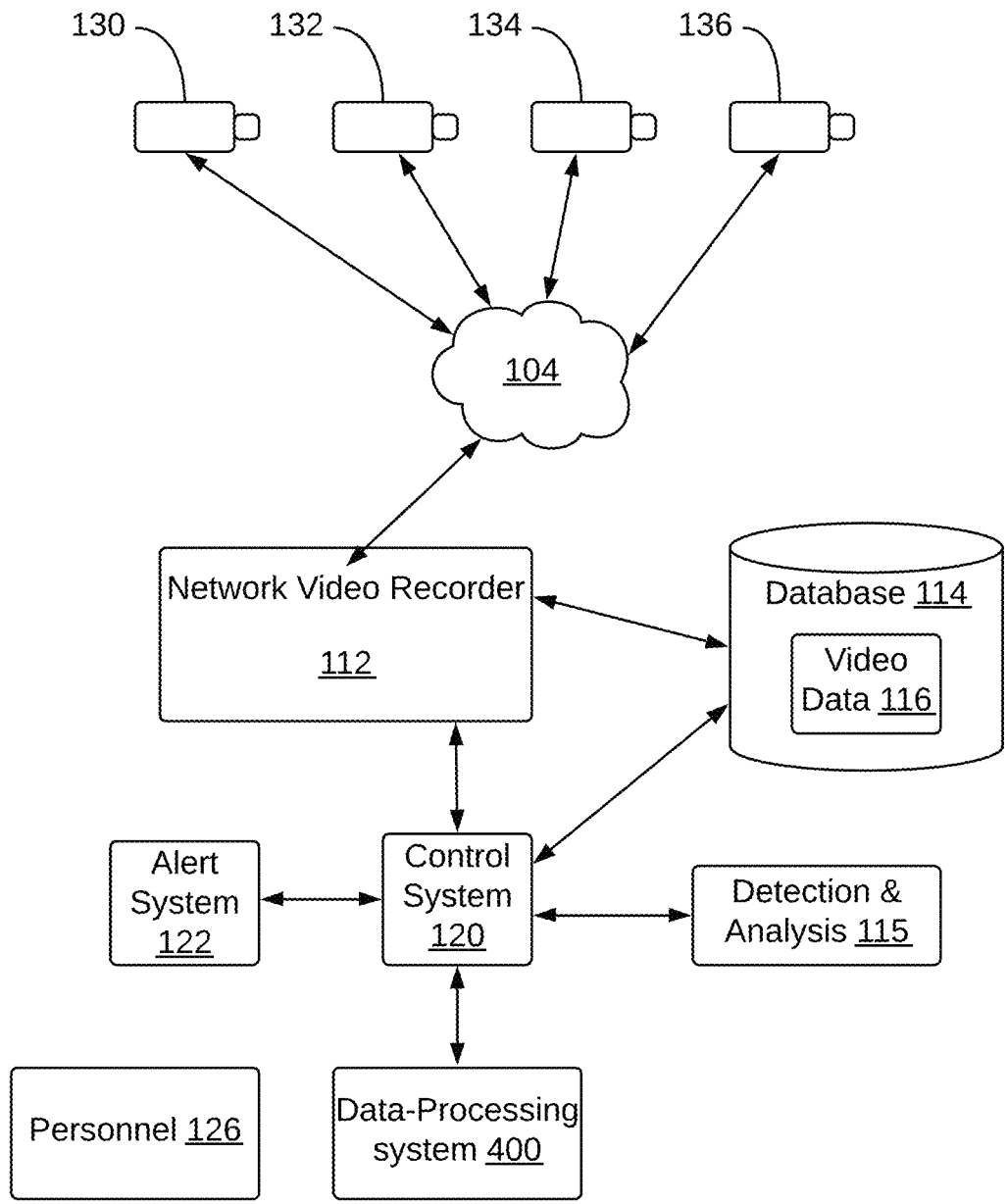
FIG. 3 illustrates a block diagram of a security system, which can be implemented in accordance with another embodiment.

FIG. 1, FIG. 2, and FIG. 3 illustrate different embodiments of a video surveillance system 100, which can be adapted for use with one or more embodiments. As shown in the FIG. 1, the video surveillance system 100 can include one or more security cameras such as a security camera 130, a security camera 132, a security camera 134, and a security camera 136. A network video recorder 112 and a database 114 can also be implemented as a part of the video surveillance system 100 to store video data including, for example, video images, video frames, metadata, and so on.

Note that the term video as utilized herein may include video data and can relate to a video stream and video streaming. Video streaming is a type of media streaming in which the data from a video file is continuously delivered via the Internet to a remote user. Video streaming allows a video to be viewed online without being downloaded on a host computer or device. The term video as utilized herein may also refer to streaming video, which can be his content that may be sent in a compressed form over a network such as the Internet and displayed by a view in real time (which can also include near real time video data or video data that is streamed in real time).

The network video recorder 112 and the security camera 130, the security camera 132, the security camera 134, and the security camera 136 can be connected to and communicate bidirectionally with a network 104. In some embodiments, the network 104 may be a private network such as a local area network provided within a building or a particular area. In other embodiments, the network 104 can include a combination of private and/or public networks so that the video data from the security camera 130, the security camera 132, the security camera 134 and/or the security camera 136 can be transmitted to the network video recorder system 112 from remote locations.

The network 104 can be, for example a cellular communications network and/or another type of network such as a wireless 802.11x type network. The network 104 can include a variety of networks, such as a WAN (Wide Area Network)/LAN (Local Area Network). The network 104 can include mass storage, such as network-attached storage (NAS), a storage area network (SAN), or other forms of computer or machine-readable media, for example. The network 104 may also include the Internet, one or more Local Area Networks (LANs), one or more Wide Area Networks (WANs), wire-line type connections, wireless type connections, or any combination thereof. Likewise, sub-networks may be employed as a part of network 104 with differing architectures or may be compliant or compatible with differing protocols, and/or may interoperate within a larger network. Various types of devices may, for example, be made available to provide an interoperable capability for differing architectures or protocols. As one illustrative example, a router may provide a link between otherwise separate and independent LANs.

The network 104 may be a wireless network that can couple client devices with the network. That is, network 104 may employ stand-alone ad-hoc networks; mesh networks, wireless LAN (WLAN) networks, cellular networks, or the like. The network 104 can further include a system of terminals, gateways, routers, or the like coupled by wireless radio links, or the like, which may move freely, randomly, or organize themselves arbitrarily, such that network topology may change, at times even rapidly. The network 104 may employ a plurality of network access technologies, including Long Term Evolution (LTE), WLAN, Wireless Router (WR) mesh, or 2nd, 3rd, 4th, 5th generation (2G, 3G, 4G, 5G) cellular technology, or the like. Network access technologies of network 104 may enable wide area coverage for devices, such as client devices with varying degrees of mobility, for example. The data-processing system 400 may be, for example, a client device with respect to the network 104.

The network 104 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. The network 104 may include virtually any type of wireless communication mechanism by which signals may be communicated between devices, such as a client device or a computing device, between or within a network, or the like.

Note that signal packets communicated via a network, such as a network of participating digital communication networks (e.g., network 104 and/or other networks) may be compatible with or compliant with one or more protocols. Signaling formats or protocols employed may include, for example, TCP/IP, UDP, DECnet, NetBEUI, IPX, AppleTalk, or the like. Versions of the Internet Protocol (IP) may include IPv4 or IPv6.

The Internet refers to a decentralized global network of networks. The Internet includes Local Area Networks (LANs), Wide Area Networks (WANs), wireless networks, or long haul public networks that, for example, allow signal packets to be communicated between LANs. Signal packets may be communicated between nodes of the network 104, such as, for example, to one or more sites employing a local network address. A signal packet may, for example, be communicated over the Internet from a user site via an access node coupled to the Internet. Likewise, a signal packet may be forwarded via network nodes of the network 104 to a target site coupled to the network 104 via a network access node, for example. A signal packet communicated via the Internet may, for example, be routed via a path of gateways, servers, etc., that may route the signal packet in accordance with a target address and availability of a network path to the target address.

The network video recorder 112 can store video data including data such as a metadata in the database 114. The term metadata as utilized herein can include data that describes the captured video data. For example, the metadata may include a camera identification number (or name), the locations of the camera in the building, its Internet Protocol address (when implemented on a data network), movement of foreground objects, and/or events of interest, to list a few examples. The term metadata can also refer to data that provides information (data) about other data. In addition to data regarding the captured video data, metadata can also include descriptive metadata, structural metadata, administrative metadata, reference metadata and statistical metadata.

The database 114 can store the video data in, for example, a video data storage 116 that can store video data captured from the camera 130, the camera 132, the camera 134 and/or the camera 136. The video data generated by one or more of the security camera 130, the security camera 132, the security camera 134 and/or the security camera 136 can be processed by a detection and detection and analysis module 115. The detection and detection and analysis module 115 can process the captured video data and perform various operations such as generating the metadata from the video data captured by the one or more of the security camera 130, the security camera 132, the security camera 134 and/or the security camera 136. The video surveillance system 100 can store the metadata associated with the video data in the video data storage 116 as well, so that security personnel 126 and/or users can search through the video data for specific events and objected contained in the archived video data later. The video data stored in the video data storage 116 may include the aforementioned metadata. The security personnel may, for example, search for objects being abandoned in a scene or object being removed from the scene, in some examples.

The network video recorder 112 can also be connected to a control system 120, which can be housed in a security room associated with, for example, a building, an area or premises being monitored. However, the security room may also be a security booth or located offsite, to list a few examples. In the illustrated example, the control system 120 can communicate with an alert system 122, which can generate alerts based on the results of the approach described herein. The video surveillance system 100 can be monitored and/or controlled by the security personnel 126 with the data-processing system 400. In the illustrated example, the security personnel 126 may be a security guard. There are multiple ways that the detection and detection and analysis module 115 can be deployed within the video surveillance system 100. Some examples of possible deployments are illustrated in FIGS. 1, 2, and 3.

As illustrated in FIG. 1, the detection and analysis module 115 can be implemented within the network video recorder 112. In this example, the video data from one or more of the security camera 130, the security camera 132, the security camera 134, and the security camera 136 can be received over the network 104 at the video recorder 112. The detection and analysis module 115 can be configured and implemented as a module that runs on the network video recorder 112 or a separate system implemented on an interface to the network video recorder 112. The term module is defined elsewhere herein.

The detection and analysis module 115 can facilitate video surveillance through the use of the security camera 130, the security camera 132, the security camera 134, and/or the security camera 136 including the detection of an owner of an abandoned object (or objects) such as abandoned luggage. As will be discussed in greater detail herein, the detection and analysis module 115 includes steps, operations and instructions such as when an object is abandoned at a fixed location in a scene in a video captured by the security camera 130, the security camera 132, the security camera 134, and/or the security camera 136, transitioning pixel intensities in a region associated with a fixed location from background values to values representing an image of the object.

In addition, the detection and analysis module 115 can identify an instance of time in the video when the object is abandoned, based on the transitioned pixel intensities resulting from the transitioning of the pixel intensities in the region associated with the fixed location from the background values to the values representing the image of the object. The detection and analysis module 115 can generate a first output comprising a video slip of a time before and after the transitioning, wherein the video slip displays an event of abandonment associated with the object, and a second output comprising an image constructed from a cross section in the constructed image intersecting the object and the transitioned pixel intensities in time. At the instant of time in which there is a change in the pixel intensities, a representation in the image of a person associated with the object can be confined to a localized region in the vicinity of the object in the image. A search of this localized region can result in an indication that the person shown in the localized region is the owner of the object that was abandoned.

As illustrated in FIG. 2, in another configuration the detection and analysis module 115 can be implemented as part of individual security cameras such as, for example, the security camera 130, the security camera 132, the security camera 134, and so on. In this embodiment, the analysis of video data can be performed within such security cameras. The video data (and in some embodiments, metadata) can be then transmitted over the network 104 to the network video recorder 112, which can then stores the video data in the database 114.

FIG. 3 illustrates yet another example. Here, the detection and analysis module 115 can be configured as a separate system that processes the video data stored in the database 114. In this example, the video data captured by the security cameras 110 can be stored to the database 114. Then, the detection and analysis module 115 can access that video data from the database 114, generate associated metadata, and store the metadata back into the video data storage 116 of the database 114. The video data and metadata can be correlated to each other via timestamps and camera identifiers stored with the metadata. This feature can enable the video data and metadata to also be correlated with the particular video camera 110 and event that gave rise to the metadata. Note that the use of metadata as discussed herein is an optional feature.

In some examples, the video data generated by the security camera 130, the security camera 132, the security camera 134, and the security camera 136 can be stored in the video data storage 116 of the database 114. In other examples, video data may be only stored when the detection and analysis module 115, upon analyzing that video data, determines that an event of interest occurred and that the video should be stored.

FIGS. 1-3 illustrate three different embodiments of the surveillance system 100. However, the security system can be embodied in many other configurations and should not be limited to these illustrated examples. For example, in another embodiment of the surveillance system 100, the detection and analysis module 115 can be implemented as a network node that is different from the network video recorder 112.

Embodiments discussed herein can relate to objects such as, but not limited to, luggage. For illustrative purposes, however, luggage scenarios are addressed herein. As discussed previously, tackling the problem of abandoned luggage can involve three ordered sub-problems:

1. Detecting the abandoned luggage;
2. Detecting the owner of the luggage; and
3. Tracking the owner of the luggage.

The disclosed embodiments address the second problem identified above (i.e., detecting the owner of the abandoned luggage). As will be discussed in greater detail herein, a method can be implemented to detect the owner of an abandoned luggage from a surveillance video. In addition, a system can be implemented to search from a long surveillance video and display only the frames showing the event of abandoning luggage. An advantage of the disclosed approach is that it is extremely easy to implement in practice and requires very less time and resources in terms of memory and processing power. Note that the term frames or frame as utilized herein can relate to a video frame, which can be individual pictures in a sequence of images from a video. A video frame can be implemented as, for example, a rectangular raster of pixels, either in an RGB color space or a color space such as YCbCr.

When a person carries an object such as a bag, places the bag somewhere and leaves the bag unattended thereafter, it may be referred to or considered as abandoned luggage or left luggage. Different heuristics can be used, such as the distance between the bag and the nearest person, the duration of time for which the bag is unmoved, etc. to obtain a quantifiable measure for use in determining if the bag has been abandoned. We can observe that the owner is in the vicinity of the luggage at the time instant, it is dropped at a place. If the time at which this event takes place can be detected, the owner can be detected in the vicinity of the bag. Thus, the disclosed approach aims to solve the problem of detecting the owner of the abandoned object by finding a suitable interval around the time at which the object (e.g., luggage) was placed there.

For the disclosed method, we can assume that any representative coordinates (x, y) in a frame of the video where we find an abandoned luggage is given as an input. The input to the disclosed module can be obtained either manually or it can be the output of an automated module to detect abandoned luggage. Alternatively, it may be required to search a bag, which has been reported as missing by a person who has lost it. This situation may require the security personnel to search for an abandoned bag, in the different surveillance videos that are available to them. Then, this module can be used to verify the owner of the detected abandoned bag.

The change in pixel values at any spatial location in the video as the time progresses can indicate the activities taking place at that spatial location, when the camera is fixed. If the pixels in the spatial location where the bag is dropped are considered, this spatial location can display a unique characteristic. That is, before the bag is placed at that location, the values indicate the color of the background. The instant the bag is placed, the values change to display the color of the bag. Unless the color of the bag and the background are very similar, which can result in camouflage, we can see a change in the appearance of the patch in the video. If the mean (or median) of the pixel intensities in this patch is plotted against time (for each frame), we can see a transition or a step at the time, when the bag is dropped.

A temporal profile of the video around the spatial point in the frames where the bag is located can be generated to visualize the change in pixel values against time. To generate this, we can consider a vertical (horizontal, if the movement of people is along the vertical axis in the video) line passing through the bag from each frame and stack them horizontally (vertically). This feature may be similar to slicing a single line in the scene and observing the changes only along that line. Below is a more detailed mathematical description of the generation of the temporal profile.

If V is the input video and a frame in V has height H and width W; we are considering N frames numbered 1, 2, ... N, then the temporal profile generated by considering a vertical line passing through the point (x, y), i.e., xth column and yth row, has a height H and width N. If V(i, j, t)

represents the pixel value at location (i, j) in the tth frame, the values of the pixels in the temporal profile P is given by the following:

$$P(m,n)=V(x,n,m)$$

$$\forall m \in \{1,2, \ldots N\} \text{ and } \forall n \in \{1,2, \ldots H\}$$

Notice that the horizontal direction in the temporal profile can indicate the time axis. After generating the temporal profile about the vertical line passing through (x, y) in the input video, we can consider a small horizontal patch T1 above and below the yth row, say from (y−5) to (y+5). We can generate an N-dimensional vector M where the value of ith element is the mean (or median) of the pixel values of the ith column of T1. The values of this vector M before t remain more or less constant, say at level L1 (a stationary regime), so do the values of the elements after t, where t is the time instant when the bag is kept at (x, y) by the owner, say at level L2 (another stationary regime), where L1 and L2 differ by a significant margin. Thus, if the bag and the background have different colors M(t−1) and M(t) differ significantly.

If moving objects temporarily occlude the bag or the background, the mean (or median) may vary temporarily. Using 1-dimensional median filters we can eliminate these aberrations (see, for example, Y. Liu, C. Liu and D. Wang, "A 1D time-varying median filter for seismic random, spike-like noise elimination", Geophysics, Volume 74, Issue 1, January 2009, Pages 1JF-Z17, which is incorporated herein by reference in its entirety). Finally by using any binary thresholding methods we can obtain a step-like curve indicating the average pixel intensities before and after the bag is placed. In our work, we have used a simple threshold, which is the mean of the minimum and maximum value of the array M. By finding the zero crossing in this curve, we can obtain the transition point, which can provide us with the time instant of the bag being dropped by the owner.

Figure 4:
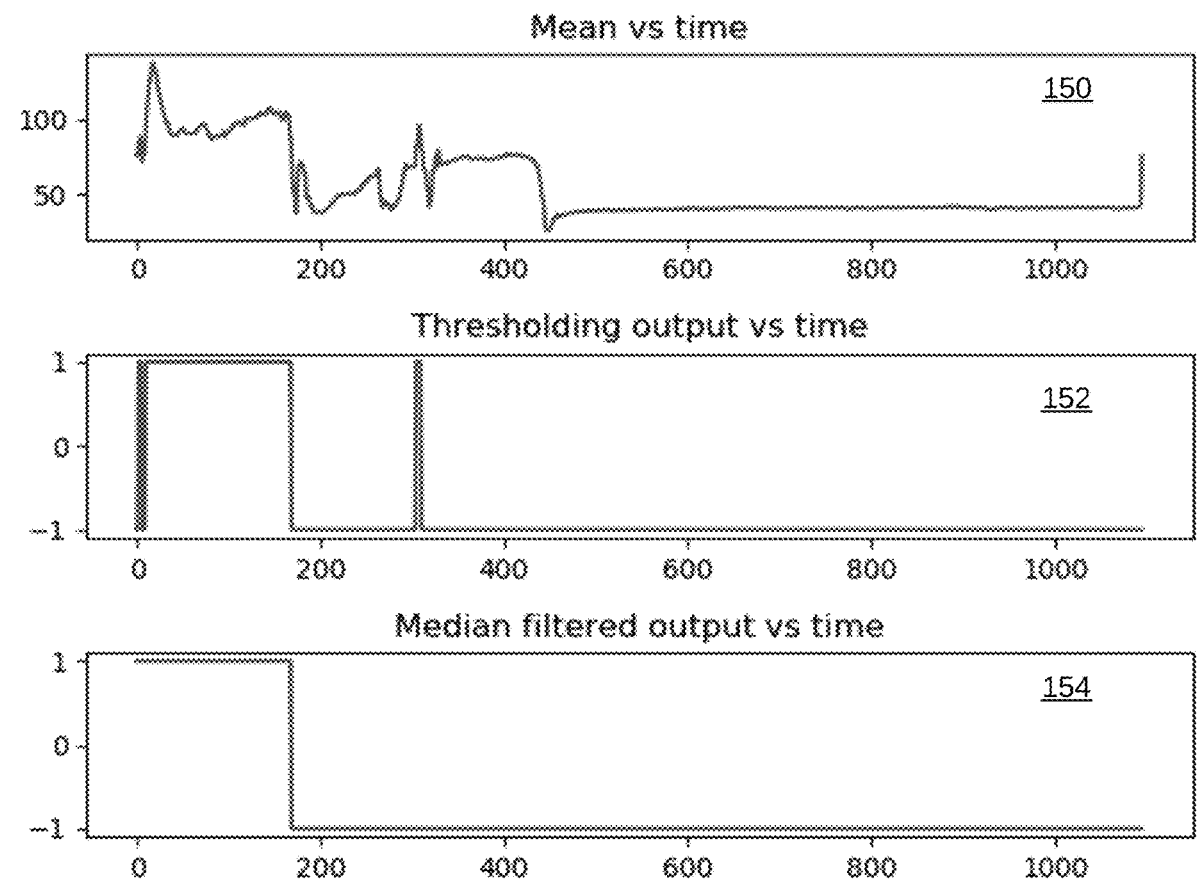
FIG. 4 illustrates a graph of mean vs. time curve, a graph of thresholding, and a graph of median filtering applied thereafter, in accordance with an embodiment.

FIG. 4 illustrates a graph 150 of mean vs. time curve, a graph 152 of thresholding, and a graph 154 of median filtering applied thereafter, in accordance with an embodiment. In graph 154, the median filtered output shows only one zero crossing, which can correspond to the time when the owner at the specific spatial location drops the bag.

If we want to draw a bounding box around the owner of the abandoned luggage, which can be further used to track the person, we can search for a human in the localized spatio-temporal region obtained using the disclosed approach. Now that we know the moment when the bag was dropped at the place where it was abandoned and the location of the bag, we can consider the corresponding frame f in the video and a small region around the bag to perform a localized search for the owner. To accomplish this, the frame f can be subtracted from the background B of the video, and can be modeled using one or more standard methods, followed by an operation involving searching or looking for moving objects in the localized region, which can satisfy a simple criterion such as, for example, the height to width ratio for a human. Note that examples of the aforementioned standard methods are disclosed in the following documents, which are incorporated herein by reference in their entireties:

S. Y. Elhabian, K. M. El-Sayed, S. H. Ahmed, "Moving object detection in spatial domain using background removal techniques-state-of-art", Recent patents on computer science 1 (2008) 32-54.

M. Cristani, M. Farenzena, D. Bloisi, V. Murino, "Background subtraction for automated multisensor surveillance: a comprehensive review", EURASIP Journal on Advances in signal Processing 2010 (2010) 43.

T. Bouwmans, "Traditional and recent approaches in background modeling for foreground detection: An overview", Computer Science Review 11 (2014) 31-66.

A. Sobral, A. Vacavant, "A comprehensive review of background subtraction algorithms evaluated with synthetic and real videos", Computer Vision and Image Understanding 122 (2014) 4-21.

It should be appreciated that the aforementioned references are discussed herein for illustrative purposes only and are not considered limiting features of the embodiments.

The size of the region can be decided heuristically based on the distance of the camera from the objects or the average size of any object/person in the scene. Other models to detect people, like the YOLO (You Only Look Once) model trained for people detection or deformable parts model etc. can also be used in the localized region to find the owner of the abandoned bag.

One method in which the disclosed approach can be embodied may be referred to as Algorithm 1, which is described in greater detail herein. The steps for such a method are discussed below. Algorithm 1 can be implemented to display the frames of the surveillance video, which show the event of abandoning luggage. For such a method, the following parameters can be established:

Input: Video V, spatial location (x, y) of the bag, orientation r (horizontal or vertical) of movement of people in the video Output: Video clip displaying the event of the bag being dropped by the owner.

The method steps of Algorithm 1 can be implemented as follows:

Step 1: If r is 'horizontal' consider a vertical line passing through (x, y), else consider a horizontal line passing through (x, y). Generate the temporal mapping T of the video about this line, as described earlier herein with respect to the description of generating a temporal profile of the video around the spatial point in the frames where the bag is located, to visualize the change in pixel values against time.

Step 2: If r is 'horizontal', consider a small horizontal strip of T, around y for the entire width of T, say 5 pixels above and below y or 5% of length of the frame. Else, consider a small vertical strip of T, around x (5 pixels to the right and left of x or 5% of width of the frame) for the entire length of T Name it T1. If r is 'horizontal', the horizontal axis in T1 represents time axis. Otherwise the vertical axis represents the time axis progressing from top to bottom.

Step 3: Compute the mean (or median) of each row/column perpendicular to the time axis of T1. Name this array as M.

Step 4: Find the mean of the minimum and maximum values in the array M. Let it be I.

Step 5: Perform binary thresholding on M with I as threshold.

Step 6: Perform median filtering on the array obtained in step 5.

Step 7: Find the zero crossing in the array obtained after median filtering (output of the step 6). Let it be t0

Step 8: Display the video clip from time (t0−Δt) to (t0+Δt) where Δt is a short duration of time comparable with the event of dropping the luggage.

Note that the detection and analysis module 115 discussed herein with respect to FIG. 1 to FIG. 3 can implement the aforementioned method of Algorithm 1 including Step 1 to Step 8 discussed above.

The present inventors have implemented experimental embodiments, the results of which are discussed below. In an experimental embodiment, a machine has been used, which includes an Intel®Core™ i7-8550U CPU with 2.00 GHz processor and 16 GB RAM.

The following is an example from a sample run of the disclosed method of Algorithm 1. The input video taken from ABODA (see ABODA—Abandoned Objects Dataset, http://imp.iis.sinica.edu.tw/ABODA/, last accessed on 22 Mar. 2019, which is incorporated herein by reference in its entirety), is of a duration of 47 seconds with 29.97 frames per second and a total of 1410 frames. The system took 1.842 seconds to process this video clip.

Figure 5:
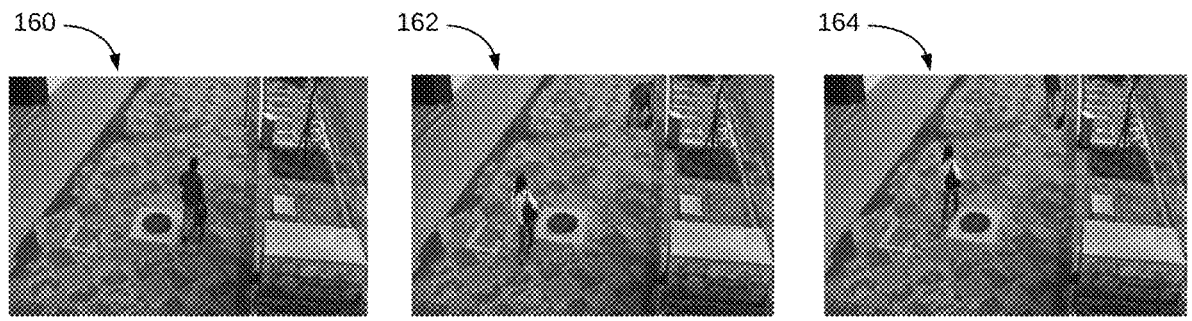
FIG. 5 illustrates images of video frames from an input video including an image depicting before the person drops the bag, an image showing that the person is dropping the bag, and image after the person drops the bag, in accordance with an embodiment.

FIG. 5 illustrates images of video frames from an input video including an image 160 depicting before the person drops the bag, an image 162 showing that the person is dropping the bag, and an image 164 after the person drops the bag, in accordance with an embodiment. FIG. 5 thus demonstrates three different frames of the video, including before, during and after the person leaves the bag abandoned, respectively.

Figure 6:
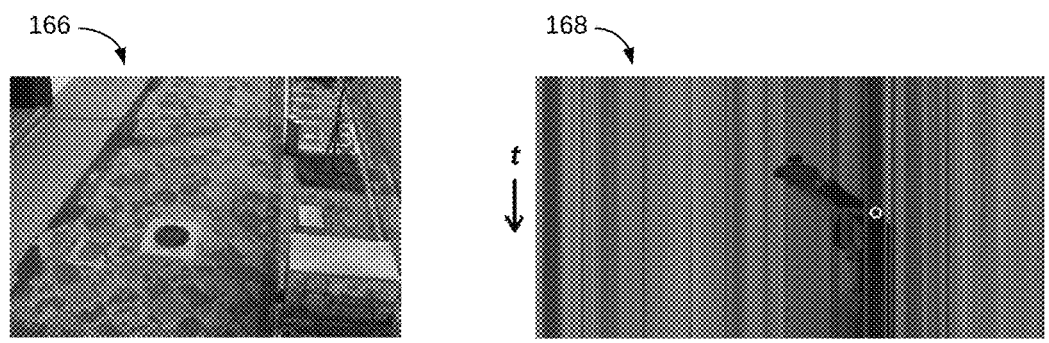
FIG. 6 illustrates an image depicting static background of input video with a red horizontal line marked about which temporal mapping is generated, and an image with a temporal mapping of the input video about the line, in accordance with an example embodiment.

FIG. 6 illustrates an image 166 depicting static background of input video with a red horizontal line marked about which temporal mapping is generated, and an image 168 with a temporal mapping of the input video about the line, in accordance with an example embodiment. Image 166 in FIG. 6 shows the static background and image 168 shows the temporal mapping of the video about the horizontal line marked red in image 168.

Figure 7:
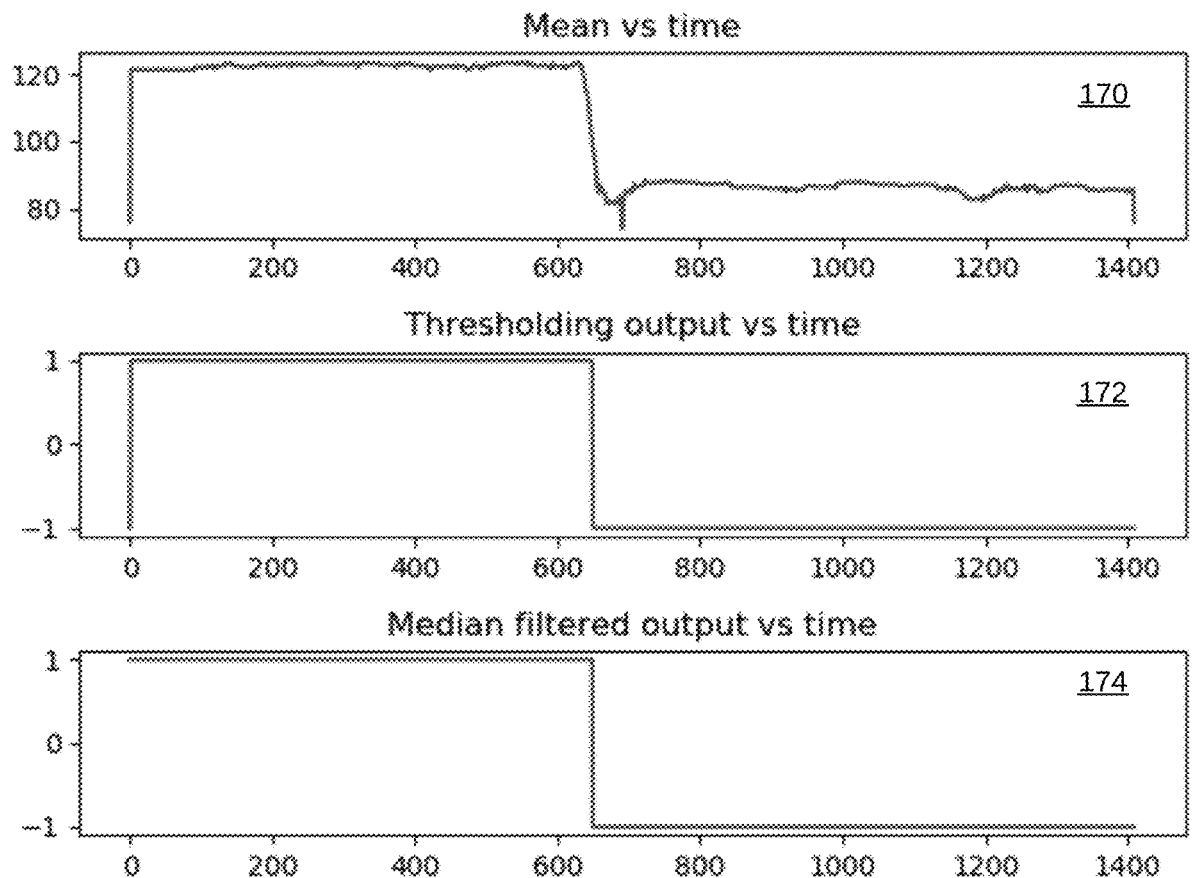
FIG. 7 illustrates graphs depicting intermediate results of the disclosed method, in accordance with an embodiment.

FIG. 7 illustrates a first graph 170, a second graph 172, and a third graph 174, which depicts the intermediate results, in accordance with an embodiment. The first graph 170 shown in FIG. 7 depicts a plot of the mean of each row of image 168 shown in FIG. 6, and around the spatial location of the bag (e.g., about 5% of the width of the frame), versus time. The second graph 174 shows the result of thresholding the curve of the first graph 170. The third graph 174 is the result of median filtering the second curve. The transition point in between t=600 and t=800 indicates the time at which the bag is dropped by the person.

Table 1 summarizes the performance of the disclosed method in terms of processing time, for experiments performed with four more input videos. In these experiments, the system was able to display the relevant output frames.

TABLE 1

| | No. of Frames Processed | Resolution of Each Frame | Time Taken for Processing (in Seconds) |
| --- | --- | --- | --- |
| Video 1 | 180 | 360 × 480 | 0.124 |
| Video 2 | 217 | 360 × 480 | 0.126 |
| Video 3 | 1447 | 266 × 400 | 0.520 |
| Video 4 | 1095 | 480 × 640 | 0.907 |

Some of the input videos, including the example video shown in FIG. 5 and FIG. 6, were taken from ABODA (Abandoned Object Dataset) and PETS 2006 dataset (e.g., see PETS 2006 Benchmark Data, http://www.cvg.reading.ac.uk/PETS2006/data.html, last accessed on 22 Mar. 2019, which is incorporated herein by reference in its entirety). Some related videos were downloaded from YouTube®, using the keywords abandoned bag, abandoned luggage etc. for the experimental embodiments. It should be appreciated that the values and parameters and results implemented in the experimental embodiments described herein are presented for illustrative and exemplary purposes only and should not be considered limiting features of the disclosed embodiments.

Figure 8:
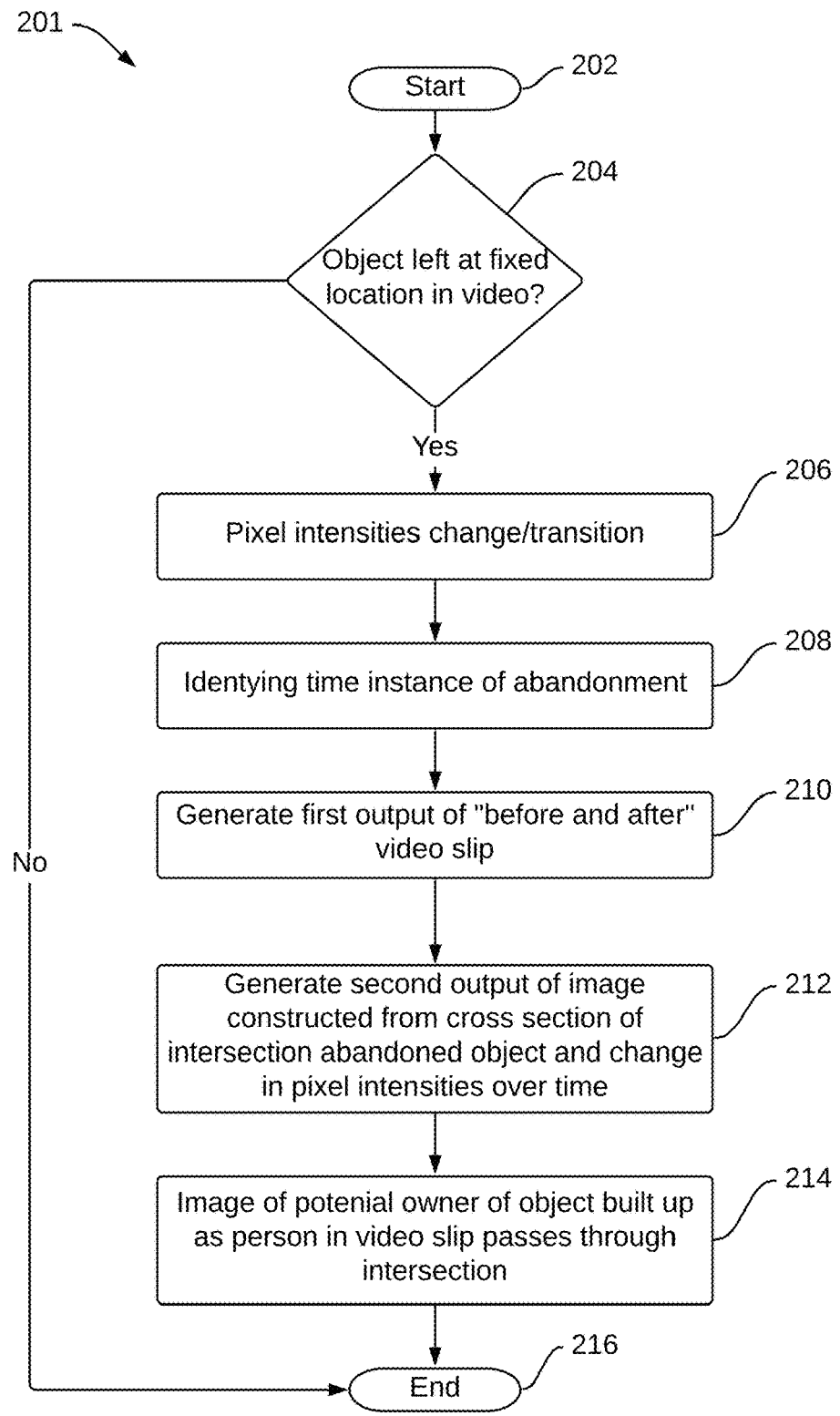
FIG. 8 illustrates a flow chart of operations depicting logical operational steps of a video surveillance method for detecting the owner of an abandoned object, in accordance with an embodiment.

FIG. 8 illustrates a flow chart of operations depicting logical operational steps of a video surveillance method 201 for detecting the owner of an abandoned object, in accordance with an embodiment. The method 201 shown in FIG. 8 is high-level version of the method discussed previously (e.g., Algorithm 1). The method 201 (and the prior discussed more detail version) can be implemented to create an image of an owner of an abandoned object from surveillance video. As shown at block 202, the process begins. Next, as depicted at decision block 204, a test can be performed to determine if an object shown in a scene in a video (e.g., a video stream or streaming video) is left at a fixed location in the scene in the video.

If it is determined that the object is not left at a fixed location in the scene in the video, then the process can end. If, however, it is determined that the object is left at a fixed location in the scene of the video, the pixel intensities in the region in the video or image can change from their background values to those values representing the image of the object, as depicted at block 206. This transition can identify the instance of time in the video stream when the object was abandoned, as shown at block 208.

Thereafter, as depicted at block 210, a first output can include a video slip before and after this transition, which shows the event of abandonment. A second output can be generated, as depicted at block 212 that can include an image formed from a cross section (either a horizontal cross section or a vertical cross section) intersecting the abandoned object and the change of pixel intensities in time. As a figure of a person passes through this cross section in the video slip, an image of the person is shown in a video frame at an instant of time when there is a change in the pixel intensities, as shown at block 214.

Thus, as the figure of the person passes through the cross section in the video slip, an image of the person can be constructed, which can provide an indication that the person shown in the video slip is the owner of the object that was abandoned or is associated with the object that was abandoned. In other words, at the instant of time when there is a change in the pixel intensities, the image of the person/owner of the object can be localized to a small region (i.e., a localized region) in the vicinity of the bag. A search for a person in this localized region can result in a detection of the owner of the abandoned object. It can be appreciated that the object may be a piece of luggage such as a bag, a box, etc., as discussed previously.

The disclosed embodiments offer several advantages. In contrast with the disclosed methods and systems, current approaches involve tracking objects in the backward direction, detecting humans and tracking blobs etc. Such approaches may involve more complex computations and tracking methods with their own set of issues such as illumination changes, temporal occlusion, a tracker becoming "confused" in a crowded scenario, etc.

The disclosed embodiments, on the other hand involve computations that are very simple, yet elegant. The disclosed embodiments also require very less time for processing, which improves the performance of the utilized data-processing systems, processors, memory and so on. The disclosed embodiments also requires fewer resources in terms of memory and processing power, and does not require sophisticated hardware such as a GPU. Because the disclosed approach does not involve the use of supervised machine learning/deep learning techniques, labeled data is also not required.

Besides using the disclosed approach for detecting the owner of an abandoned object such as a bag, the embodiments can be used in other applications such as, for example, counting the number of people, vehicles crossing a line, detecting traffic rule violations etc.

The disclosed embodiments are described at least in part herein with reference to the flowchart illustrations, steps and/or block diagrams of methods, systems, and computer program products and data structures. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which can execute via the processor of the computer or other programmable data processing apparatus, and may create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of GUI features may be considered a special-purpose computer designed with the specific purpose of detecting the owner of an abandoned object. In general, however, embodiments may be implemented as a method, and/or a computer program product at any possible technical detail level of integration. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams may represent a module, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

Figure 9:
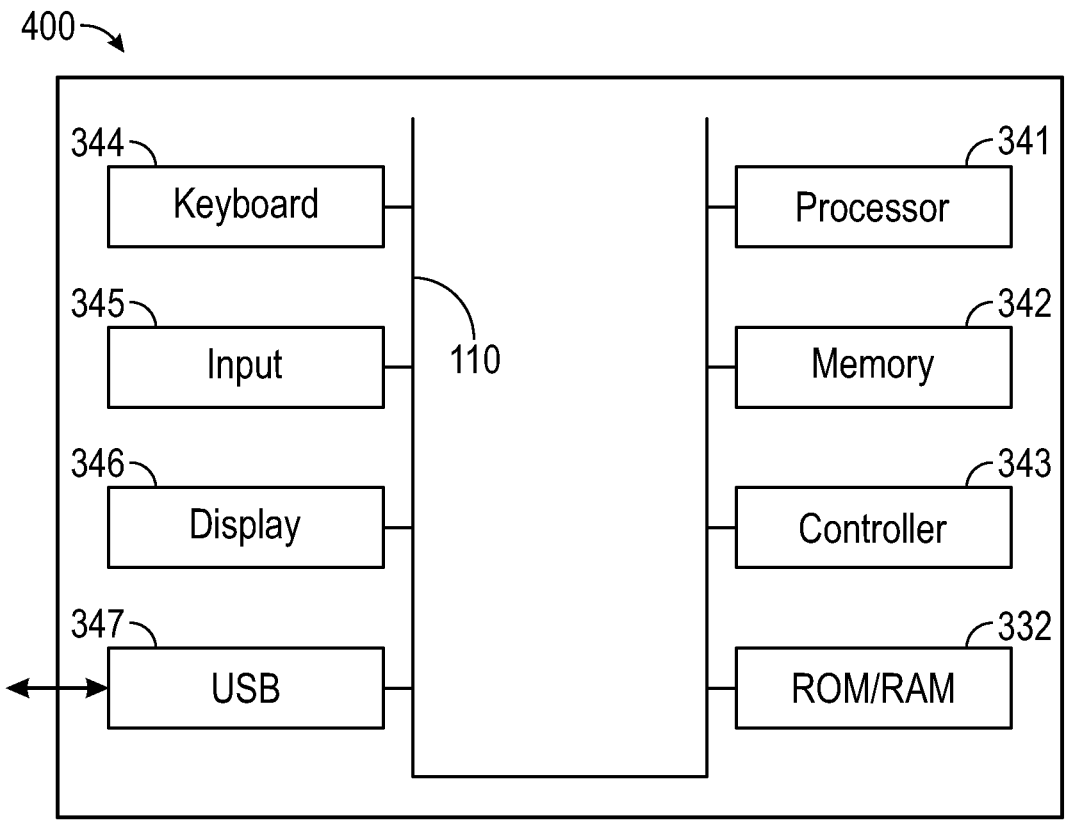
FIG. 9 illustrates a schematic view of a computer system, in accordance with an embodiment.
Figure 10:
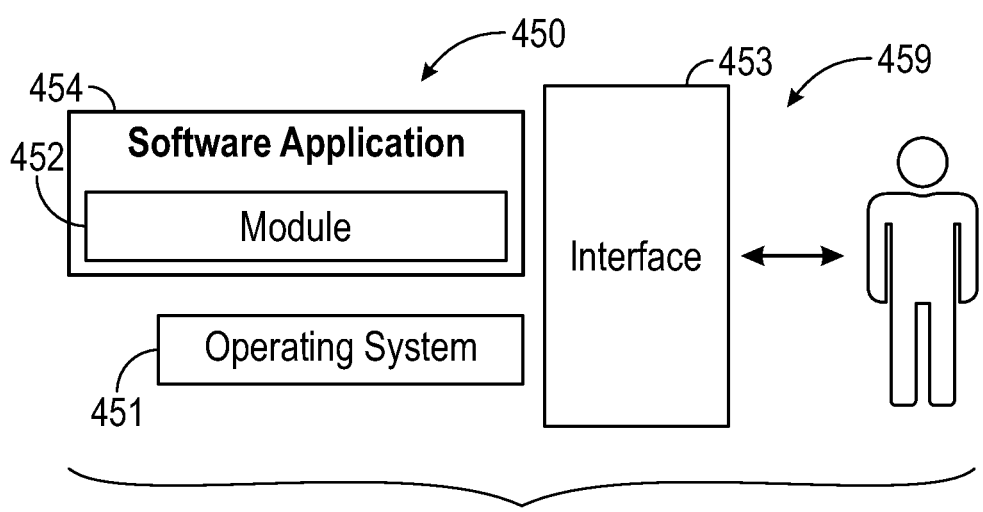
FIG. 10 illustrates a schematic view of a software system including a module, an operating system, and a user interface, in accordance with an embodiment.

FIGS. 9-10 are shown only as exemplary diagrams of data-processing environments in which example embodiments may be implemented. It should be appreciated that FIGS. 9-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 9, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components. The database 114 illustrated and discussed previously herein may in some embodiments be located with, for example, the memory 342 or another memory.

The system bus 110 serves as the main electronic information highway interconnecting the other illustrated components of the hardware of data-processing system 400. In some embodiments, the processor 341 may be a CPU that functions as the central processing unit of the data-processing system 400, performing calculations and logic operations required to execute a program. Read only memory (ROM) and random access memory (RAM) of the ROM/RAM 332 constitute examples of non-transitory computer-readable storage media.

The controller 343 can interface with one or more optional non-transitory computer-readable storage media to the system bus 110. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM and/or RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 10 illustrates a computer software system 450 for directing the operation of the data-processing system 400 depicted in FIG. 9. The software application 454, may be stored for example in memory 342 and/or another memory and can one or more modules such as the module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the steps, instructions or operations such as those discussed herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a data-processing system such as, for example, the data-processing system 400 shown in FIG. 9.

A "module" can perform the various steps, operations or instructions discussed herein. The module 452 shown in FIG. 10 can implement, for example, the detection and analysis module 115 including the various steps of the previously described method of Algorithm 1 and the various steps and operations shown in the blocks in FIG. 8. The module 452 can also provide for instructions for operating the alert system 122, the control system 120, the network video recorder 112, the security camera 130, the security camera 132, the security camera 134, the security camera 136, and the database 114, including the storage of video data in the video data storage.

The disclosed embodiments can constitute an improvement to a computer system (e.g., such as the data-processing system 400 shown in FIG. 10) rather than simply the use of the computer system as a tool. The disclosed modules, instructions, steps and functionalities discussed herein can result in a specific improvement over prior systems, resulting in improved data-processing systems.

FIGS. 9-10 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. The disclosed embodiments require less time for processing and also fewer resources in terms of memory and processing power in the underlying computer technology. Such improvements can result from implementations of the disclosed embodiments. The claimed solution may be rooted in computer technology in order to overcome a problem specifically arising in the realm of computers, computer networks and call center platforms.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A video surveillance method, comprising:
transitioning pixel intensities in a region associated with a fixed location from background values to values representing an image of an object, when the object is abandoned as shown at the fixed location in a scene in a video;
identifying an instance of time in the video when the object is abandoned, based on the transitioned pixel intensities resulting from the transitioning of the pixel intensities in the region associated with the fixed location from the background values to the values representing the image of the object; and
generating a first output comprising a video slip of a time before and after the transitioning, wherein the video slip displays an event of abandonment associated with the object, and a second output comprising an image constructed from a cross section in the constructed image intersecting the object and the transitioned pixel intensities in time, wherein at an instant of time in which there is a change in the pixel intensities, a representation in the image of a person associated with the object is confined to a localized region in a vicinity of the object in the image, wherein a search of this localized region results in an indication that the person shown in the localized region is an owner of the object that was abandoned.

2. The method of claim 1 wherein the cross section includes a horizontal cross section.

3. The method of claim 1 wherein the cross section includes a vertical cross section.

4. The method of claim 1 wherein the cross section includes at least one of a horizontal cross section and a vertical cross section.

5. The method of claim 1 wherein the region comprises a localized spatio-temporal region.

6. The method of claim 1 wherein the object comprises a piece of luggage.

7. The method of claim 1 wherein a performance of a data-processing system is improved by:
the transitioning of pixel intensities in a region associated with a fixed location from background values to values representing an image of the object;
the identifying of an instance of time in the video when the object is abandoned, based on the transitioned pixel intensities resulting from the transitioning of the pixel intensities in the region associated with the fixed location from the background values to the values representing the image of the object; and
the generating of the first output and the second output.

8. A video surveillance system, comprising:
at least one processor and a memory, the memory storing instructions to cause the at least one processor to perform:
when an object is abandoned at a fixed location in a scene in a video, transitioning pixel intensities in a region associated with the fixed location from background values to values representing an image of the object;
identifying an instance of time in the video when the object is abandoned, based on the transitioned pixel intensities resulting from the transitioning of the pixel intensities in the region associated with the fixed location from the background values to the values representing the image of the object; and
generating a first output comprising a video slip of a time before and after the transitioning, wherein the video slip displays an event of abandonment associated with the object, and a second output comprising an image constructed from a cross section in the constructed image intersecting the object and the transitioned pixel intensities in time, wherein at an instant of time in which there is a change in the pixel intensities, a representation in the image of a person associated with the object is confined to a localized region in a vicinity of the object in the image, wherein a search of this localized region results in an indication that the person shown in the localized region is an owner of the object that was abandoned.

9. The system of claim 8 wherein the cross section includes a horizontal cross section.

10. The system of claim 8 wherein the cross section includes a vertical cross section.

11. The system of claim 8 wherein the cross section includes at least one of a horizontal cross section and a vertical cross section.

12. The system of claim 8 wherein the region comprises a localized spatio-temporal region.

13. The system of claim 8 wherein the object comprises a piece of luggage.

14. The system of claim 8 further comprising a data-processing system comprising at least one of: the at least one processor and the memory, wherein a performance of a data-processing system is improved by:
the instructions for transitioning pixel intensities in a region associated with a fixed location from background values to values representing an image of the object;
the instructions for identifying of an instance of time in the video when the object is abandoned, based on the transitioned pixel intensities resulting from the transitioning of the pixel intensities in the region associated with the fixed location from the background values to the values representing the image of the object; and
the instructions for generating the first output and the second output.

15. A video surveillance system, comprising:
at least one surveillance camera that captures video of a scene, wherein when an object is abandoned at a fixed location in the scene in the video captured by the at least one surveillance camera, pixel intensities are transitioned by a processor in a region associated with the fixed location from background values to values representing an image of the object;

wherein the processor identifies an instance of time in the video when the object is abandoned, based on the transitioned pixel intensities resulting from the transitioning of the pixel intensities in the region associated with the fixed location from the background values to the values representing the image of the object; and wherein the processor generates a first output comprising a video slip of a time before and after the transitioning, wherein the video slip displays an event of abandonment associated with the object, and a second output comprising an image constructed from a cross section in the constructed image intersecting the object and the transitioned pixel intensities in time, wherein at an instant of time in which there is a change in the pixel intensities, a representation in the image of a person associated with the object is confined to a localized region in a vicinity of the object in the image, wherein a search of this localized region results in an indication that the person shown in the localized region is an owner of the object that was abandoned.

16. The system of claim 15 wherein the cross section includes a horizontal cross section.

17. The system of claim 15 wherein the cross section includes a vertical cross section.

18. The system of claim 15 wherein the cross section includes at least one of a horizontal cross section and a vertical cross section.

19. The system of claim 15 wherein the region comprises a localized spatio-temporal region.

20. The system of claim 15 wherein the object comprises a piece of luggage.

* * * * *